(12) United States Patent
Yang et al.

(10) Patent No.: US 11,546,320 B2
(45) Date of Patent: Jan. 3, 2023

(54) TRIGGER IOT DEVICE AND FUNCTIONAL IOT DEVICE AND IOT SYSTEM ASSOCIATED THEREWITH AND METHOD FOR CONTROLLING THEREOF

(71) Applicants: ThroughTek Co., Ltd., Taipei (TW); ThroughTek Technology (Shenzhen) Co., Ltd., Shenzhen (CN)

(72) Inventors: Chung-Han Yang, Taipei (TW); Ying-Hao Chu, Taipei (TW); Kai-Kuo Liu, Taipei (TW)

(73) Assignees: THROUGHTEK CO., LTD., Taipei (TW); THROUGHTEK TECHNOLOGY (SHENZHEN) CO., LTD., Shenzhen (CN)

( * ) Notice: Subject to any disclaimer, the term of this patent is extended or adjusted under 35 U.S.C. 154(b) by 491 days.

(21) Appl. No.: 16/733,658

(22) Filed: Jan. 3, 2020

(65) Prior Publication Data
US 2020/0220860 A1 Jul. 9, 2020

Related U.S. Application Data

(60) Provisional application No. 62/788,346, filed on Jan. 4, 2019.

(51) Int. Cl.
*H04L 29/06* (2006.01)
*H04L 9/40* (2022.01)
*H04L 67/125* (2022.01)
*H04L 9/08* (2006.01)

(52) U.S. Cl.
CPC .......... *H04L 63/083* (2013.01); *H04L 9/0861* (2013.01); *H04L 67/125* (2013.01)

(58) Field of Classification Search
CPC ............................ H04L 63/083; H04L 9/0861
See application file for complete search history.

(56) References Cited

U.S. PATENT DOCUMENTS

2015/0365394 A1* 12/2015 Fitch ........................ H04L 63/08
726/7
2016/0087933 A1* 3/2016 Johnson ................. H04W 12/35
709/245

* cited by examiner

*Primary Examiner* — Wasika Nipa
(74) *Attorney, Agent, or Firm* — WPAT, PC (57) ABSTRACT

A method for controlling the IoT devices and an IoT system using the same are provided. The IoT devices includes a trigger device and a functional device. A managing software is executable on a client device. First, a credential is sent to the client from the functional device. Second, a script is received at the trigger device. The script includes the credential, at least one supported command, and at least one supported event. The script is generated at the managing software. The supported command is recognizable to the functional device. When the supported event is triggered at the trigger device, the supported command from the trigger device is received at the functional device. Then, a function of the functional device is performed based on the command, which increases the convenience of operating the system. The trigger device need not recognize the command, which increases the flexibility of the system.

11 Claims, 5 Drawing Sheets

TRIGGER IOT DEVICE AND FUNCTIONAL IOT DEVICE AND IOT SYSTEM ASSOCIATED THEREWITH AND METHOD FOR CONTROLLING THEREOF

RELATED APPLICATIONS

This application claims priority to U.S. provisional patent application, No. 62/788,346, filed on Jan. 4, 2019, entitled "Decentralized IoT Structure", which is incorporated herein by reference in its entirety.

BACKGROUND OF THE INVENTION

Technical Field

The present invention relates to a method for controlling IoT devices and an IoT system using the same. More particularly, the present invention relates to an event-triggered method for controlling IoT device and .an IoT system using the same.

Description of Related Art

Along with the development of technology, many electronic devices are now equipped with network connecting abilities, to stay on line 24 hours a day and 7 days a week. Especially when the whole electronic and communication industry is ready to step into the era of the next generation telecommunication—the 5$^{th}$ generation of mobile networks, more and more internet of things (IoT) devices have been used in our daily life. IoT devices are not only deployed in public places like train stations, libraries, and government buildings, they are also used in the offices of private companies and the living rooms of our houses.

The IoT devices can be easily purchased in 3C stores, but the ways to setup, configurate, and even operate the devices are not typically easy. To setup, configurate, and operate the IoT devices, consumers are usually required to have some experiences in software operation, which may be easy for professional users and 3C enthusiasts. However, for regular users, they may be troublesome, and sometimes lead to operation or connection failure of the devices.

Since almost everyone has a smartphone nowadays, a known method for setting up, configuring, and operating the IoT devices is by way of a smartphone. The smartphone can act as a hub or control center for the IoT devices, and all the operation and setup steps can be done on the smartphone automatically or at least partially automated, so as to reduce the complexity of user operation. However, the introduction of the smartphone in the IoT network raises the issue of security and sometimes increases the complexity for configurating or operating the IoT devices, departing from the goal of reducing user operation.

Therefore, how to easily setup and operate the IoT devices and at the same time increase the safety of the IoT network remains one of the major problems needed to be solved for the industry.

SUMMARY

The method for controlling IoT devices and the IoT system using the same use a trigger IoT device to send at least one supported command to a functional IoT device when at least one event is triggered, so that the functional IoT device performs a function according to the supported command. The supported command is contained in a script generated at a managing software on a client device. The trigger IoT device forwards the supported command to the functional IoT device without the need to recognize or understand the supported command. The complexity of user operation can be reduced and the flexibility and the convenience of the IoT system can be increased.

According to one aspect of the invention, a method for controlling multiple IoT devices associated with an IoT system is provided. The IoT devices includes a trigger IoT device and a functional IoT device. A managing software is executable on a client device being associated with the IoT system. The method includes the steps of: sending, from the functional IoT device, a credential to the client device after the functional IoT device and the client device are paired; receiving, at the trigger IoT device, a script from the client device after the trigger IoT device and the client device are paired, wherein the script comprises the credential, at least one supported command, and at least one supported event, wherein the script is generated at the managing software and the at least one supported command is recognizable to the functional IoT device; establishing a connection between the trigger IoT device and the functional IoT device in accordance with the credential when the at least one supported event is triggered at the trigger IoT device; receiving, at the functional IoT device, the at least one supported command from the trigger IoT device; and, performing, at the functional IoT device, a function of the functional IoT device based on the at least one supported command.

In one embodiment of the method, the method further includes the steps of: generating, at the functional IoT device, a pre-shared key and a secret ID; and, generating, at the functional IoT device, the credential based on the pre-shared key and the secret ID.

In another embodiment of the method, the method further includes the steps of: sending, from the trigger IoT device, the at least one supported event to the client device.

In a further embodiment of the method, wherein the trigger IoT device is a door sensor and the step of establishing the connection between the trigger IoT device and the functional IoT device includes the following step: when a door with which the door sensor is associated is opened, the at least one supported event is triggered.

In yet another embodiment of the method, wherein the functional IoT device is a network video recorder and the function of the functional IoT device is video recording.

In yet a further embodiment of the method, the method further includes the steps of: receiving, at the trigger IoT device, the script.

According to another aspect of the invention, a trigger IoT device associated with an IoT system is provided. The trigger IoT device includes a logic module and a communication module. The logic module is configured for determining whether at least one supported event is triggered. The communication module connects with the logic module and is configured for receiving a script from a client device associated with the IoT system, wherein the script includes a credential, at least one supported command, and the at least one supported event, wherein the credential is sent from a functional IoT device associated with the IoT system to the client device, the at least one supported command is recognizable to the functional IoT device, and the script is generated at a managing software executable on the client device, and the communication module is further configured for establishing a connection with the functional IoT device in accordance with the credential when the at least one event is triggered and for sending the at least one supported command to the functional IoT device so that a function of the functional IoT device is performed based on the at least one supported command.

In one embodiment of the invention, the communication module is further configured for sending the at least one supported event to the client device.

In another embodiment of the invention, the trigger IoT device is a door sensor, and when a door with which the door sensor is associated is opened, the at least one supported event is triggered.

In a further embodiment of the invention, the communication module is further configured for receiving the script from the client device.

According to a further aspect of the invention, a functional IoT device associated with an IoT system is provided. The functional IoT device includes an operating module and a network module. The operating module is configured for performing a function base on at least one supported command. The network module connects with the operating module and is configured for sending a credential to a client device associated with the IoT system, establishing a connection with a trigger IoT device associated with the IoT system in accordance with the credential when at least one supported event is triggered at the trigger IoT device, and receiving the at least one supported command of a script from the trigger IoT device, wherein the script is generated at a managing software executable on the client device.

In one embodiment of the invention, the functional IoT device further comprises a generating module which is configured for generating a pre-shared key and a secret ID, and for generating the credential based on the pre-shared key and the secret ID.

In another embodiment of the invention, the at least one supported command is sent from the functional IoT device to the client before the script is generated at the managing software.

In a further embodiment of the invention, the functional IoT device is a network video recorder and the function is video recording.

According to yet another aspect of the invention, an IoT system is provided. The IoT system includes a managing software, a trigger IoT device, and a functional IoT device. The managing software is executable on a client device for generating a script based on a credential, at least one supported event, and at least one supported command. The trigger IoT device includes a logic module and a communication module. The logic module is configured for determining whether the at least one supported event is triggered. The communication module communicationally connects to the logic module and is configured for receiving the script from the client device. The functional IoT device includes an operating module and a network module. The network module communicationally connects to the operating module and is configured for sending the credential to the client device and receiving the at least one supported command from the trigger IoT device, wherein the at least one supported command is recognizable to the functional IoT device, the communication module is further configured for establishing a connection with the network module in accordance with the credential when the at least one supported event is triggered, and the operating module is configured for performing a function of the functional IoT device based on the at least one supported command.

In one embodiment of the invention, the at least one supported command is sent from the functional IoT device to the client before the script is generated at the managing software.

The above-mentioned method for controlling IoT devices and IoT system using the same uses the trigger IoT device to act as an agent to forward the at least one supported command to the functional IoT device. The trigger IoT device need not understand nor recognize the command, so as to increase the flexibility of the IoT system. The function of the functional IoT device is performed based on the command when the at least one event is triggered at the trigger IoT device, which reduces the complexity of setting up and configuring the IoT system, and the burden of user operation can be reduced as well.

BRIEF DESCRIPTION OF DRAWINGS

The invention can be more fully understood by reading the following detailed description of the embodiment, with reference made to the accompanying drawings as follows.

DETAILED DESCRIPTION

Reference will now be made in detail to elaborate the contents and the features of the embodiments of the present invention, examples of which are illustrated in the accompanying drawings.

The method for controlling IoT devices and the IoT system using the same use a trigger IoT device to send at least one supported command to a functional IoT device when at least one event is triggered, so that the functional IoT device performs a function according to the supported command.

The supported command is contained in a script generated at a managing software on a client device. The trigger IoT device acts as an agent for forwarding the supported command to the functional IoT device without the need to recognize or understand the supported command. During transmitting the supported command, the supported command can be encoded through cryptographic keys and/or verified through secret IDs, so the safety can be enhanced. The embodiments of the invention also help to reduce the complexity of configurating of the IoT system and increasing the convenience of operating the IoT device.

Figure 1:
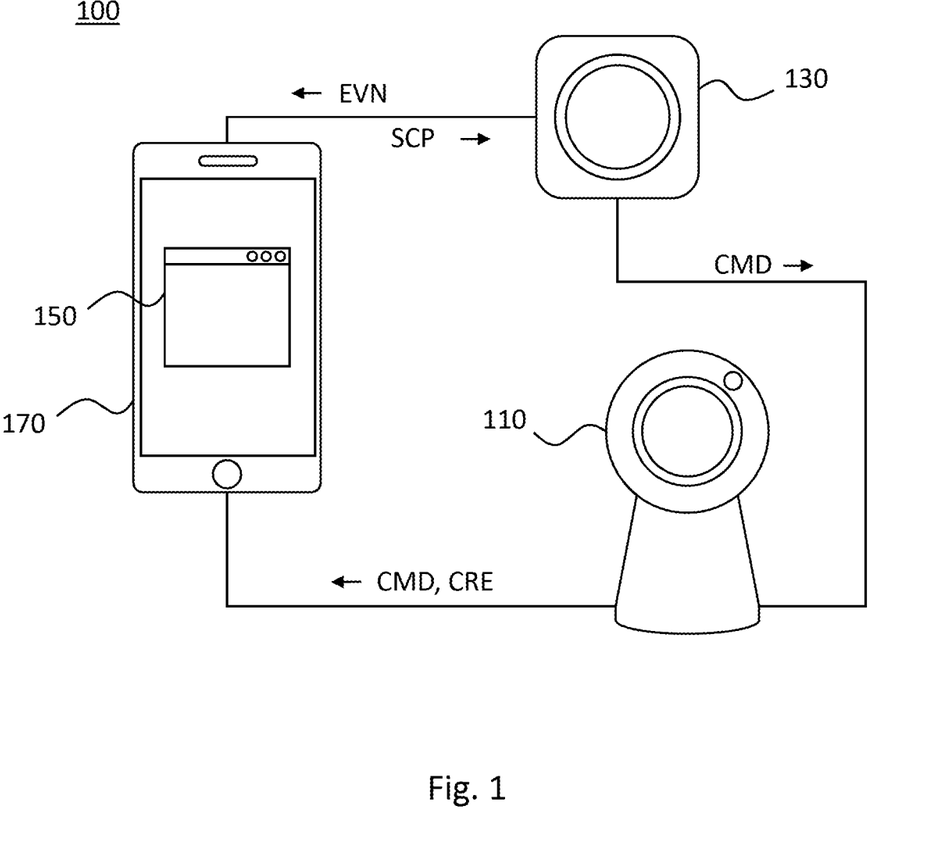
FIG. 1 is a schematic diagram of an IoT system according to one embodiment of the invention.
Figure 2:
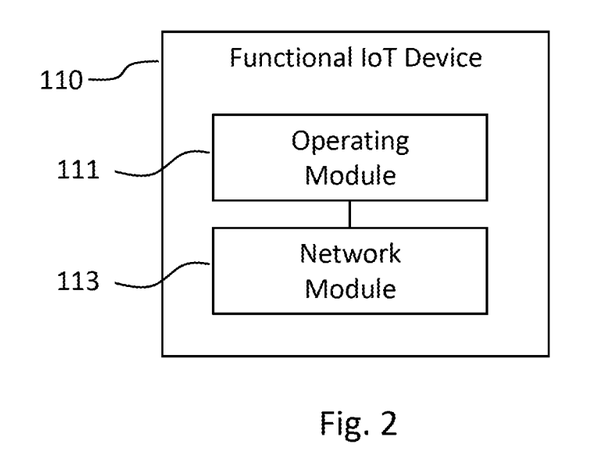
FIG. 2 is a detailed schematic diagram of the functional IoT device of FIG. 1.
Figure 3:
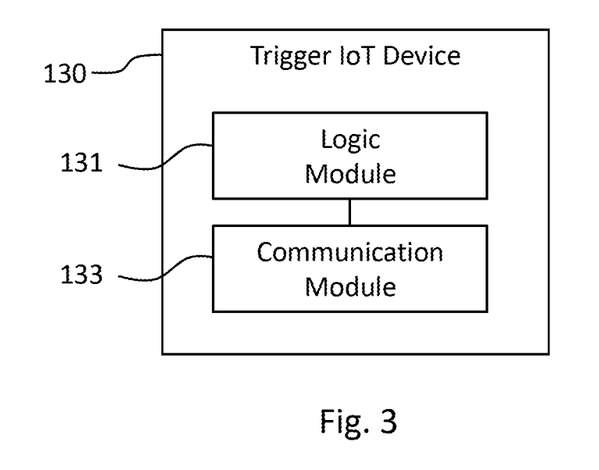
FIG. 3 is a detailed schematic diagram of the trigger IoT device of FIG. 1.

Please refer to FIG. 1 to FIG. 3. FIG. 1 is a schematic diagram of an IoT system according to one embodiment of the invention. FIG. 2 is a detailed schematic diagram of the functional IoT device of FIG. 1. FIG. 3 is a detailed schematic diagram of the trigger IoT device of FIG. 1. The IoT system 100 includes a managing software 150, a trigger IoT device 130, and a functional IoT device 110.

The managing software 150 is executable on a client device 170 for generating a script SCP based on a credential CRE, at least one supported event EVN, and at least one supported command CMD.

The trigger IoT device 130 includes a logic module 131 and a communication module 133. The logic module 131 is configured for determining whether the supported event EVN is triggered or not. The communication module 133 communicationally connects to the logic module 131 and is configured for receiving the script SCP from the client device 170.

The functional IoT device 110 includes an operating module 111 and a network module 113. The network module 113 communicationally connects to the operating module 111 and is configured for sending the credential CRE to the client device 170 and for receiving the supported command CMD from the trigger IoT device 130. The communication module 133 is further configured for establishing a connection with the network module 113 in accordance with the credential CRE when the supported event EVN is triggered.

The supported command CMD is recognizable to the functional IoT device 110. The operating module 111 of the functional IoT device 110 is configured for performing a function of the functional IoT device 110 based on the supported command CMD.

The supported command CMD can be predefined in the managing software 150 by the manufacturer of the functional IoT device 110 (usually the same manufacturer as the managing software 150); or it can be input by the user of the client device 170. In the present embodiment, the supported command CMD is sent from the functional IoT device 110 to the client device 170 before the script SCP is generated at the managing software 150. Any other command, as long as the command is supported and is recognizable to the functional IoT device 110, fall within the scope of the invention.

In the IoT system 100 of the present embodiment, the credential CRE and the supported command CMD is sent from the functional IoT device 110 to the client device 170 after the client device 170 and the functional IoT device 110 are paired; exemplarily in response to the inquiry from the client device 170. The communication module 133 is further configured for sending the supported event EVN to the client device 170 after the client device 170 and the trigger IoT device 130 are paired; exemplarily in response to the inquiry from the client device 170.

Figure 4:
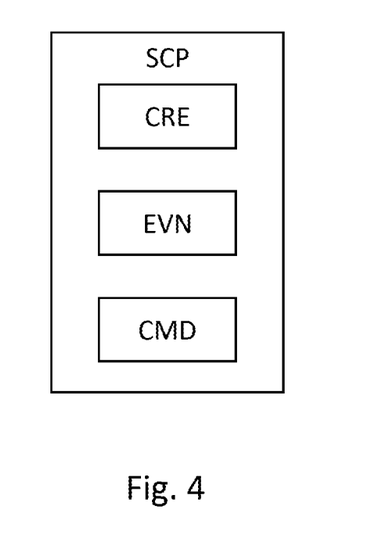
FIG. 4 is a schematic diagram of the script according to one embodiment of the invention.

Please refer to FIG. 4, which is a schematic diagram of the script according to one embodiment of the invention. The script SCP is generated at the managing software 150 and includes at least the supported event EVN, the supported command CMD, and the credential CRE. Exemplarily, the user can use the managing software 150 to combine the supported event EVN and the supported command CMD based on any desirable scenarios to form event-trigger conditions.

In one embodiment, the supported event EVN may include the data structure exemplarily shown in below table 1. The trigger IoT device 130 is a light switch for controlling the on/off of a smart light bulb.

TABLE 1

| HINT | TYPE | SIGNAL | ... | VALUE |
|---|---|---|---|---|
| LightOn | eq | lightswitch | ... | 1 |
| LightOff | eq | lightswitch | ... | 0 |

In one embodiment, the supported command CMD may include the data structure exemplarily shown in below table 2. The functional IoT device 110 is a video recorder that has the night mode capability.

TABLE 2

| HINT | INPUT | FUNCTION | ... | VALUE |
|---|---|---|---|---|
| NightModeOn | void | SetNightMode | ... | 1 |
| NightModeOff | void | SetNightMode | ... | 0 |

The script SCP can be generated based on the supported event EVN and the supported command CMD, and can be exemplified by the following format.

```
addRule
#Request
{
    "func":"äddRule",
    "args":{
        "description":"<description>",
        "udid":"<udid>"
        "ctx": "<ctx_string>"
        "type": "<type>"
        "conditionHint": "LightOn"
        "condition" : {
            "type" : "eq"
            "signal" : "lightSwitch"
            "value" : 1
        }
        "commandHint": "NightModeOn"
        "command" : {
            "func": "setNightMode"
            "args" : {
                "value" : 1
            }
        }
    }
}
```

In the script SCP, the "request and response" can be defined in any desirable format. For example, 5 types of actions can be defined: GET: acquiring designated information; SET: setting the designated information; ADD: adding information; DEL: deleting designated information; and DO: having the specified device execute the specified content. It should be noted, the script SCP is not limited to the above-mentioned 5 types of request and response. Any other format that can generate the script SCP based on the supported event EVN and the supported command CMD is usable in the present invention.

Please refer back to FIG. 1 to FIG. 3. The communication module 133 is further configured for receiving the script SCP from the client device 170; i.e. the generated script SCP is sent to the trigger IoT device 130. When the supported event EVN is triggered at the trigger IoT device 130, the communication module 133 establishes the connection with the functional IoT device 110 based on the credential CRE. Then the trigger IoT device 130 sends the supported command CMD contained in the script SCP to the functional IoT device 110 through the connection; i.e. the functional IoT device 110 receives the supported command CMD of the script SCP from the trigger IoT device 130. As a result, the functional IoT device 110 performs the function relating to the supported command CMD.

In one embodiment, the trigger IoT device 130 is a door sensor. When a door with which the door sensor is associated is opened, the supported event EVN is triggered. The functional IoT device 110 is a network video recorder, and the function of which is video recording. The IoT system 100 can to therefore perform video recording when the door is opened.

However, the event trigger IoT device 130 is not limited to the door sensor. Any other IoT devices which can be paired with the client device 170 and receive the script SCP from the client device 170, and send out the supported command CMD when the supported event EVN is triggered, can be used as the trigger IoT device 130 in the present invention. The trigger IoT device 130 forwards the supported command CMD to the device 110 when the supported event EVN is triggered, without the capability of recognizing or understanding the supported command CMD. The trigger IoT device 130 can be cheaper, easy to deploy, and have less function than the functional IoT device 110.

The supported event EVN can be configured or defined according to the type of the trigger IoT device 130. For example, when the trigger IoT device 130 is a light switch, the supported event EVN can be light-on or light-off.

Similarly, the functional IoT device 110 is not limited to a video recorder. Any other IoT devices which can be paired with the client device 170, send the credential CRE and the supported command CMD to the client device 170, and receive the supported command CMD from the trigger IoT device 130 to perform one or more function, can be used as the functional IoT device 110 in the present invention. The function(s) can be defined based on the type of the functional IoT device 110.

Figure 5:
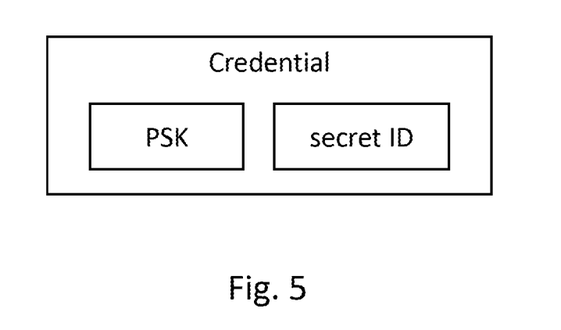
FIG. 5 is a schematic diagram of the credential of one embodiment of the invention.

Please refer to FIG. 5, which is a schematic diagram of the credential of one embodiment of the invention. The functional IoT device 110, in another embodiment, may further include a generating module which is configured for generating a pre-shared key PSK and a secret ID, and generating the credential CRE based on the pre-shared key PSK and the secret ID. The pre-shared key PSK can be used to encrypt the supported command CMD. The client device 170 has a corresponding pre-shared key PSK to decrypt the encrypted supported command CMD. The communication safety can therefore be enhanced. The secret ID can be used to check, at the server, whether the client device 170 has been paired with the IoT device 130 or not. Because while pairing with the client device 170, the IoT device 130 dynamically generates the secret ID and sends it to the client device 170. While logging to the server, the IoT device 170 uploads the secret ID to the server, and the server can subsequently use the secret ID to validate the client device 170. By using the dynamically generated secret ID, the safety of the IoT system 100 can be further enhanced.

Please refer back to FIG. 1 to FIG. 3. In yet another embodiment, the trigger IoT device 130 can be provided with the function and the mechanism of the functional IoT device 110, and the functional IoT device 110 can be provided with the function and the mechanism of the trigger IoT device 130. One type of IoT device that has the functions of both the trigger IoT device 130 and the functional IoT device 110 can be used in the IoT system 100. By using the same type of IoT device, the cost and the complexity of deploy, configuring the IoT system 100 can be reduced.

The IoT system 100 according to the above-mentioned embodiments of the present invention includes the managing software 150, the trigger IoT device 130, and the functional IoT device 110. The trigger IoT device 130 does not need to recognize or understand the supported command CMD. The trigger IoT device 130 merely transmits the supported command CMD, which is contained in the script SCP from the client device 170, to the functional IoT device 110 when the event EVN is triggered. The trigger IoT device 130 can be used regardless of the type of the functional IoT device 110, which increases the flexibility of deploy the IoT system 100, and the functional IoT device 110 can be operated or controlled in accordance with the triggered event EVN automatically, which increases the convenience of operating the IoT system 100 and lowers the burden of user operation.

Figure 6:
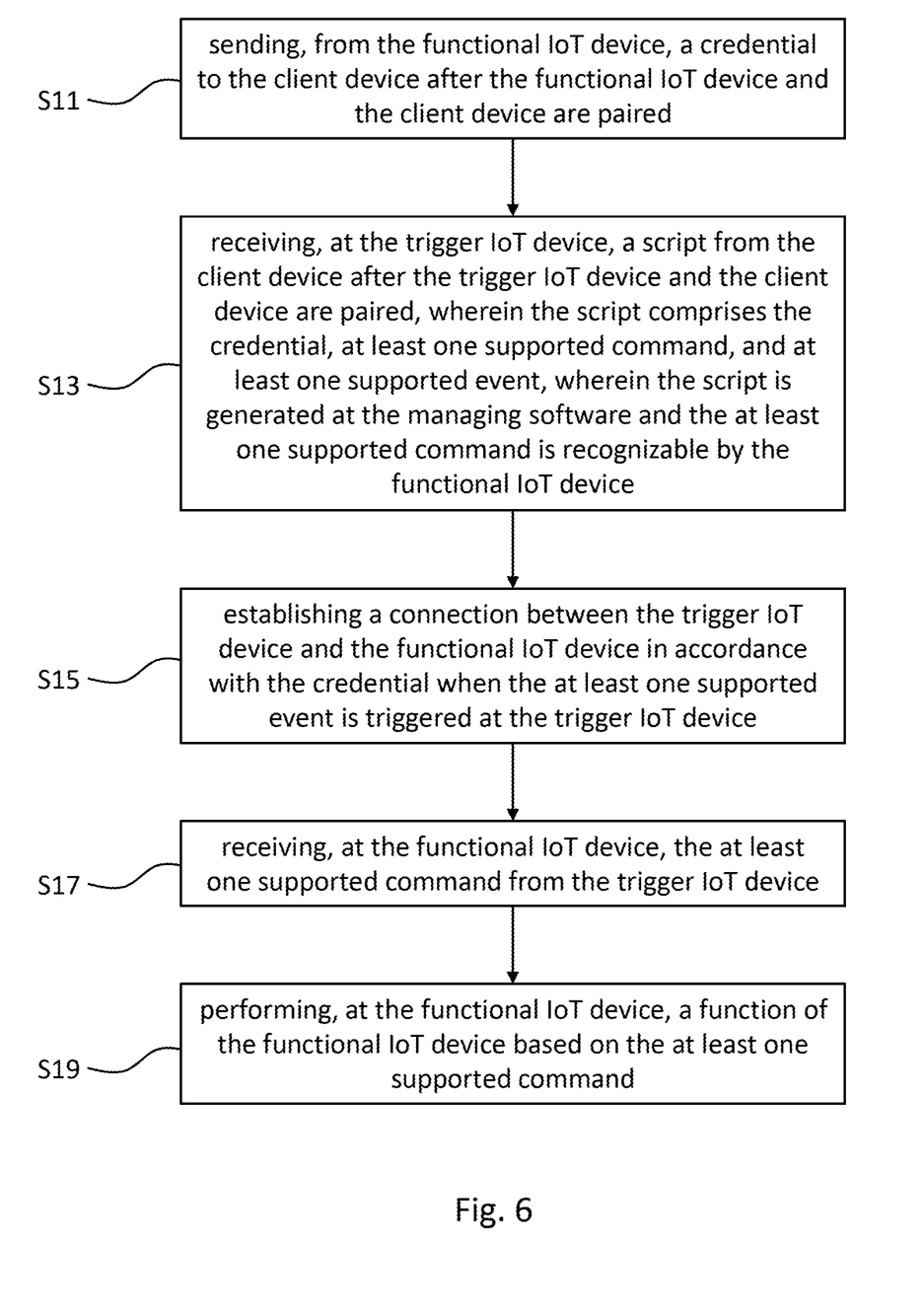
FIG. 6 is a flow chart of a method for controlling multiple IoT devices associated with an IoT system according to one embodiment of the invention.

Please refer to FIG. 6, which is a flow chart of a method for controlling multiple IoT devices associated with an IoT system according to one embodiment of the invention. A managing software is executable on a client device being associated with the IoT system. The IoT devices includes a trigger IoT device and a functional IoT device which are similar to the above-mentioned IoT devices of FIG. 1 to FIG. 3, and their content and detail will not be repeated herein. The method at least includes the following steps.

First in step S11, a credential is sent from the functional IoT device to the client device after the functional IoT device and the client device are paired. The step of sending the credential does not necessarily immediately follow the pairing of the devices. Once the two devices are paired, the credential can be sent based on the request at the time when needed.

Then in step S13, a script is received at the trigger IoT device. The script is sent from the client device after the trigger IoT device and the client device are paired. Similarly, the step of sending the script does not necessarily immediately follow the pairing of the two devices. The script includes the credential, at least one supported command, and at least one supported event. The script is generated at the managing software and the at least one supported command is recognizable by the functional IoT device.

Then in step S15, a connection between the trigger IoT device and the functional IoT device is established in accordance with the credential when the supported event is triggered at the trigger IoT device.

Further, the method moves on to step S17, the supported command is received at the functional IoT device. The supported command is sent from the trigger IoT device through the connection after the supported event is trigger.

Furthermore, step S19 is performed. In step S19, a function is performed at the functional IoT device based on the supported command.

In one embodiment of the present invention, before step S11 of sending the credential, the method includes the steps of: generating, at the functional IoT device, a pre-shared key and a secret ID; and, generating, at the functional IoT device, the credential based on the pre-shared key and the secret ID. The pre-shared key can be used to encrypt the content of communication, like the supported command, so as to enhance the safety. The secret ID can be used to validate the identity of the client device, and the safety can be enhanced as well.

In one embodiment of the present invention, before step S13 of receiving the script at the trigger IoT device, the method includes the step of sending, from the trigger IoT device, the supported event to the client device. Therefore, the client device can generate the script based on at least the supported event.

In one embodiment of the present invention, before step S13 of the receiving the script at the trigger IoT device, the method includes the step of sending, from the functional IoT device, the supported command to the client device. Therefore, the client device can generate the script based on at least the supported command.

The script is generated based on the supported event and the supported command, and after the script is generated, the method further includes the step of receiving the script at the trigger IoT device. Therefore, the trigger IoT device can forward the supported command in the script to the functional IoT device when the supported event is triggered.

In one embodiment of the invention, the trigger IoT device is a door sensor and the step of establishing the connection between the trigger IoT device and the functional IoT device includes the step of: triggering the supported event at the trigger IoT device when a door with which the door sensor is associated is opened. However, the trigger IoT device is not limited to the door sensor. Any other IoT devices that can send the supported event(s) to the client device is applicable in the present invention, such as light switch, temperature sensor, and any other kind of sensing devices.

In one embodiment of the invention, the functional IoT device is a network video recorder and the function of the functional IoT device is video recording. However, the functional IoT device is not limited to the network video recorder. Any other IoT devices can send supported command(s) to the client device is applicable in the present invention, such as smart light bulb, music player, and any other kind of functional devices.

According to above-mentioned method, the function of the functional IoT device can be performed by the supported command sent from the trigger IoT device when the supported event is triggered. The functional IoT device can be controlled or operated automatically, which increases the convenience of operating the IoT system, and lowers the burden of user operation. By receiving script and sending the supported command in the script to the functional IoT device, the trigger IoT device does not need to recognize or understand the supported command. The trigger IoT device merely transmits the supported command to the functional IoT device when the supported event is triggered. The trigger IoT device can be used regardless of the type of the functional IoT device, which increases the flexibility. The functional IoT device can be operated or controlled automatically, which increases the convenience of operating the IoT system.

Figure 7:
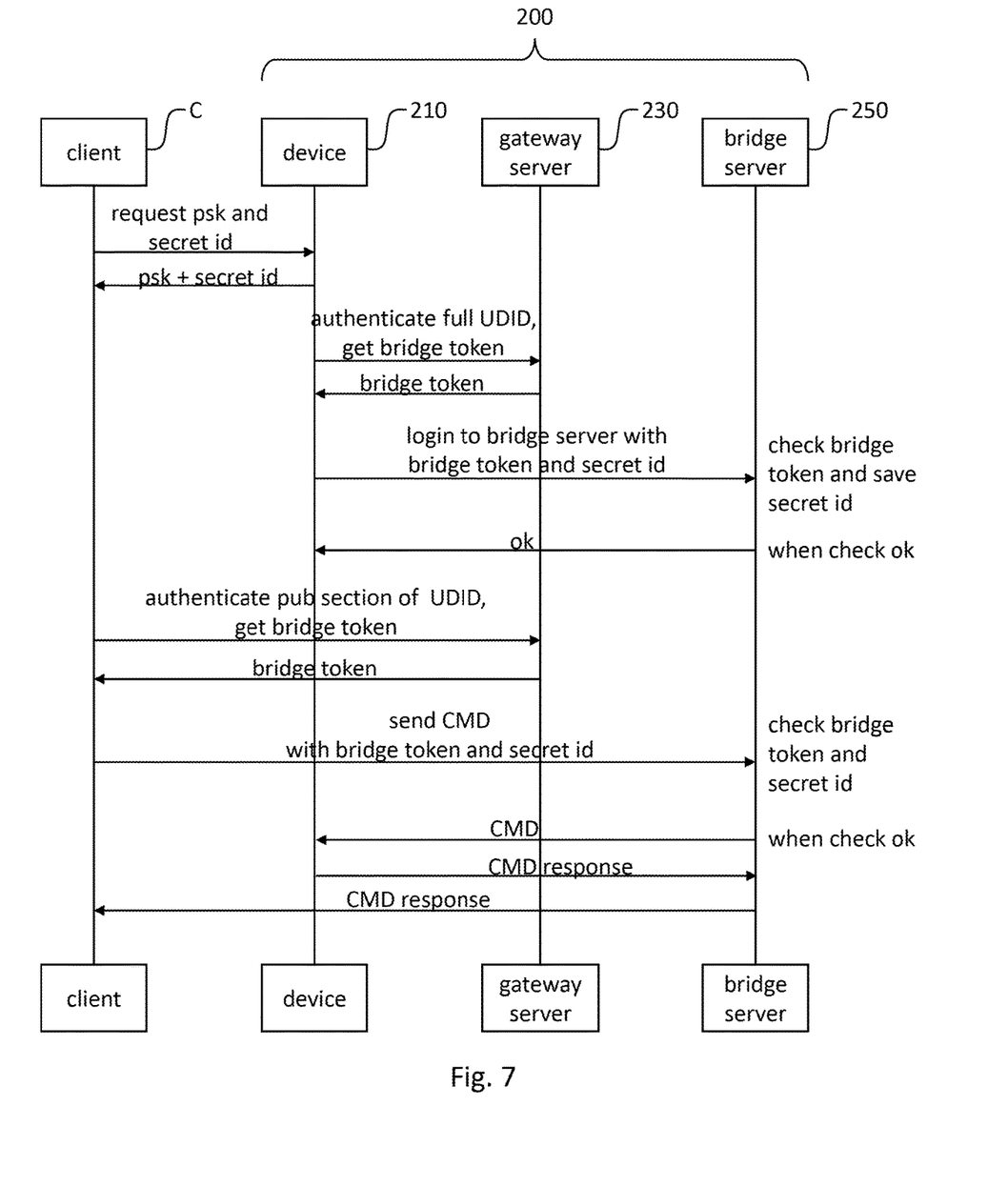
FIG. 7 is schematic diagram showing a method for controlling IoT device associated with an IoT system according to another embodiment of the invention.

Please refer to FIG. 7, which is a schematic diagram showing a method for controlling IoT device associated with an IoT system according to another embodiment of the invention. The IoT system 200 includes at least one IoT device 210, a gateway server 230, and a bridge server 250. The method of the present embodiment uses a UDID and a secret ID to validate the identity of the client device C, so as to prevent an imposter device from sending command to the IoT device 210. The safety of the IoT system 200 is enhanced.

First, between the paired IoT device 210 and the client device C, when the IoT device 210 receives a request for a pre-shared key PSK and a secret ID from the client device C, the IoT device 210 sends the pre-shared key PSK and the secret ID to the client device C. Each IoT device 210 has the unique UDID. The pre-shared key PSK and secret ID is generated at the IoT device 210 based upon request.

Second, between the IoT device 210 and the gateway server 230, the IoT device 210 uses a full UDID, exemplarily 106 digits in length, to be authenticated by the gateway server 230 and tries to get a bridge token. After successfully authenticated by the gateway server 230, said server 230 provides the bridge token to the IoT device 210.

Then, between the IoT device 210 and the bridge server 250, the IoT device 210 uses the received bridge token and the secret ID to login to the bridge server 250. The bridge server 250 checks the bridge token and saves the secret ID from the IoT device 210 when the bridge token is validated. Afterwards, the bridge server 250 responses login successful to the IoT device 210 (as indicated by "OK" in FIG. 7).

Further, between the client device C and the gateway server 230, the client device C uses a public section of the UDID, exemplarily 40 digits in length, to be authenticated by the gateway server 230 and tries to get the bridge token. After successfully authenticated by the gateway server 230, said server 230 provides the bridge token to the client device C.

Afterwards, between the client device C and the bridge server 250, the client device C tries to send a command CMD to the IoT device 210 by way of the bridge server 250. The client device C sends the command CMD with the secret ID and the bridge token. The bridge server 250 checks the bridge token and checks secret ID from the client device C to the one saved on the bridge server 250. When the bridge token and the secret ID are checked to be correct, the bridge server 250 forward the command CMD to the IoT device 210. After the IoT device 210 receives the command CMD, it sends a command response (CMD response) to the bridge server 250. Then the CMD response is transmitted to the client device C.

During the above-mentioned method, when the public section of the UDID is incorrect, the client device 210 would not get the bridge token and cannot subsequently connect to the bridge server 250. The safety of the IoT system 200 is enhanced.

On the other hand, even when the client device C knows the public section of the UDID and get the bridge token accordingly, without getting the correct secret ID from the paired IoT device 210, the client device C would not able to pass through the checking of the bridge server 250. The client device C still cannot send the command to the IoT device 230. Therefore, the safety of the IoT system 200 is further enhanced.

The UDID includes the public section (exemplarily 40 digits) and an unpublished section (exemplarily 96 digits in length). The UDID can be used to validate the identity of the IoT device 230, and is not accessible to the client device C. Normally, only the public section of the UDID will be printed on the box of the product, and only the manufacturer knows the full UDID. Therefore, the UDID can reduce the risk of unauthorized, theft use.

According to the embodiments of the method for controlling IoT devices and the IoT system using the same of the present invention, the IoT devices includes the trigger IoT device and the functional IoT device, and the managing software is executable on the client device. The trigger IoT receives the script from the client device including the credential, the at least one supported event from the trigger IoT device, and the at least one supported command from the functional IoT device. When the supported event is triggered at the trigger IoT device, the supported command is sent to the functional IoT device and thus it can be operated, and its function can be performed. The trigger IoT device acts as an agent for forwarding the supported command to the functional IoT device without the need to recognize or understand the supported command. The same trigger IoT device can be used in related to different kinds of functional IoT devices in the IoT system. The flexibility of the IoT system can be increased, and the burden of user operation can be reduced. During transmitting the supported command, the supported command can be encoded through cryptographic keys and/or verified through secret IDs, so the safety can be enhanced.

The ordinal numbers used in the detailed description and claims, such as "first", "second", "third", and "fourth", do not necessarily indicate their priority orders; on the contrary, they are merely intended to distinguish different elements.

Although the method steps in the detailed description are marked with orderly reference numbers, they are not intended to limit the priorities of the steps. Unless otherwise explicitly provided in the claim language, the order of the method steps may be performed in any possible manner. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

What is claimed is:

1. A method for controlling a plurality of IoT devices associated with an IoT system, the IoT devices comprising a trigger IoT device and a functional IoT device, a managing software executable on a client device being associated with the IoT system, the method comprising:
    sending, from the functional IoT device, a credential to the client device after the functional IoT device and the client device are paired;
    receiving, at the trigger IoT device, a script from the client device after the trigger IoT device and the client device are paired, wherein the script comprises the credential, at least one supported command, and at least one supported event, wherein the script is generated at the managing software and the at least one supported command is recognizable to the functional IoT device, and the script is generated after sending, from the functional IoT device, the at least one supported command to the client device;
    establishing a connection between the trigger IoT device and the functional IoT device in accordance with the credential when the at least one supported event is triggered at the trigger IoT device;
    receiving, at the functional IoT device, the at least one supported command from the trigger IoT device;
    performing, at the functional IoT device, a function of the functional IoT device based on the at least one supported command;
    generating, at the functional IoT device, a pre-shared key and a secret ID; and
    generating, at the functional IoT device, the credential based on the pre-shared key and the secret ID.

2. The method according to claim 1, further comprising:
    sending, from the trigger IoT device, the at least one supported event to the client device.

3. The method according to claim 1, wherein the trigger IoT device is a door sensor and the step of establishing the connection between the trigger IoT device and the functional IoT device comprises:
    when a door with which the door sensor is associated is opened, the at least one supported event is triggered.

4. The method according to claim 1, wherein the functional IoT device is a network video recorder and the function of the functional IoT device is video recording.

5. The method according to claim 1, further comprising:
    receiving, at the trigger IoT device, the script.

6. A trigger IoT device associated with an IoT system, comprising:
    a logic module and a communication module connecting to the logic module, the trigger IoT device being characterized in that, the logic module determines whether at least one supported event is triggered; and
    the communication module receives a script from a client device associated with the IoT system, wherein the script comprises a credential, at least one supported command, and the at least one supported event, wherein the credential is sent from a functional IoT device associated with the IoT system to the client device, the credential based on a pre-shared key and a secret ID generated by the functional IoT device, the at least one supported command is recognizable to the functional IoT device, and the script is generated at a managing software executable on the client device after the functional IoT device sending the at least one supported command to the client device, and the communication module establishes a connection with the functional IoT device in accordance with the credential when the at least one event is triggered and sends the at least one supported command to the functional IoT device so that a function of the functional IoT device is performed based on the at least one supported command;
    wherein all the recited modules comprise hardware processor and memory.

7. The trigger IoT device according to claim 6, wherein the communication module further sends the at least one supported event to the client device.

8. The trigger IoT device according to claim 6, wherein the trigger IoT device is a door sensor, and when a door with which the door sensor is associated is opened, the at least one supported event is triggered.

9. The trigger IoT device according to claim 6, wherein the communication module further receives the script from the client device.

10. An IoT system comprising a managing software executable on a client device, a trigger IoT device comprising a logic module and a communication module connecting to the logic module, and a functional IoT device comprising an operating module and a network module connecting to the operating module, the IoT system being characterized in that,
    the managing software generates a script based on a credential, at least one supported event, and at least one supported command;
    the logic module of the trigger IoT device determines whether the at least one supported event is triggered;
    the communication module of the trigger IoT device receives the script from the client device, and the script is generated after sending, from the functional IoT device, the at least one supported command to the client device;
    the network module of the functional IoT device sends the credential to the client device, and receives the at least one supported command from the trigger IoT device;
    wherein the at least one supported command is recognizable to the functional IoT device, the communication module further establishes a connection with the network module in accordance with the credential when the at least one supported event is triggered, and the operating module performs a function of the functional IoT device based on the at least one supported command;
    wherein the credential is based on a pre-shared key and a secret ID generated by the functional IoT device;
    wherein all the recited modules comprise hardware processor and memory.

11. The IoT system according to claim 10, wherein the at least one supported command is sent from the functional IoT device to the client before the script is generated at the managing software.

* * * * *